UNITED STATES PATENT OFFICE.

CLYDE J. COLEMAN, OF NEW ROCHELLE, NEW YORK, ASSIGNOR TO STERN-COLEMAN DIAMOND MACHINE COMPANY, INC., OF NEW YORK, N. Y.

MEANS FOR HOLDING DIAMONDS DURING ABRASIVE TREATMENT.

1,291,769.  Specification of Letters Patent.  Patented Jan. 21, 1919.

No Drawing.   Application filed December 22, 1913.  Serial No. 808,279.

*To all whom it may concern:*

Be it known that I, CLYDE J. COLEMAN, a citizen of the United States, residing at New Rochelle, in the county of Westchester and State of New York, have invented certain new and useful Improvements in Means for Holding Diamonds During Abrasive Treatment, of which the following is a specification, reference being had therein to the accompanying drawings, forming part thereof.

My invention relates to the art of cutting and polishing diamonds or the abrasive treatment thereof, and relates more particularly to means for holding the diamond during the cutting and polishing operations or during the polishing operation.

This invention is another specific form of my prior invention broadly claimed in my co-pending application, Serial No. 710,621, filed July 20, 1912. My said prior invention included a cement of such a nature as to be adapted to successfully withstand the heat of polishing the diamond and to adhesively hold the diamond during the polishing operation.

My present invention is a cement particularly well adapted for this purpose and adapted to be used in a considerable body to form a stem to be anchored in the arbor and to adhesively hold the diamond, permitting the use of a metallic or steel arbor.

I have discovered that an excellent cement for this purpose may be formed of a suitable carbid, preferably combined with a suitable metallic oxid, such as tungstic oxid, and with a boron compound, preferably borax. These are made into a thick paste, and for this purpose the addition of a sufficient quantity of water has been found suitable. This paste is applied between the stone and the arbor, preferably being applied in considerable body so that it will be anchored in the arbor and will form a stem within the arbor for adhesively holding the diamond, and it is baked with the parts together, at a high temperature in a non-oxidizing environment, as by inclosure in a retort containing carbon monoxid or hydrogen gas. The heat is first applied at a low temperature to dry the material, and then at a high temperature. I have found that a temperature of 1800° Fahrenheit is suitable for this puropse. The total baking operation usually requires from twenty-five to thirty minutes. When the cement is so adhesively secured to the diamond it is of such a character that it will not loosen the diamond by reason of the heat during the polishing of the diamond.

Specifically the carbid which I have found to give the best results is iron carbid. A cement made from the following formula is the best which I have thus far been able to produce; carbid of iron, thirteen parts; borax, two parts; tungstic oxid, three parts; and sufficient water to make the composition into a thick paste.

While my present invention is intended more particularly for use in polishing diamonds, it may also be advantageously employed for the preceding roughing out or bruting operation, thereby obviating the necessity of the present practice of having to remove the diamond from the arbor employed in bruting and to attach and recenter it on another arbor for polishing.

It is obvious that various modifications may be made in the herein described specific embodiment of my invention, as by varying the proportions or by substituting chemical equivalents for one or more of the ingredients, within the scope of my invention.

I claim:

1. Means for holding a diamond, comprising a diamond-holding cement containing carbid of iron, borax and tungstic oxid.

2. Means for holding a diamond, comprising a diamond-holding cement composed of thirteen parts carbid of iron, two parts borax, and three parts tungstic oxid, substantially as described.

3. Means for holding a diamond, comprising a diamond holding cement composed largely of carbid of iron and adapted to be adhesively secured to the diamond, and having the physical characteristic that it will not loosen the diamond by reason of the heat during the polishing of the diamond.

4. Means for holding a diamond comprising a diamond holding cement containing a carbid of iron and a sodium compound of boron, and adapted to be adhesively secured to the diamond and having the physical characteristic that it will not loosen the diamond by reason of the heat during the polishing of the diamond.

5. Means for holding a diamond, comprising a diamond holding cement containing carbid of iron, a sodium compound of boron and oxid of tungsten, and adapted to be adhesively secured to the diamond, and having the physical characteristic that it will not loosen the diamond by reason of the heat during the polishing of the diamond.

6. Means for holding a diamond, comprising a diamond holding cement containing carbid of iron borax and tungstic oxid, and adapted to be adhesively secured to the diamond and having the physical characteristic that it will not loosen the diamond by reason of the heat during the polishing of the diamond.

7. Means for holding a diamond during abrasive treatment, comprising a cement composed largely of carbid of iron, and containing oxid of tungsten, and a sodium compound of boron.

In testimony whereof I have affixed my signature in presence of two witnesses.

CLYDE J. COLEMAN.

Witnesses:
  HENRY D. WILLIAMS,
  M. M. ALCORN.